(12) United States Patent
Heikrodt

(10) Patent No.: US 6,430,925 B2
(45) Date of Patent: Aug. 13, 2002

(54) METHOD AND DEVICE FOR OPERATING A HEATING AND COOLING MACHINE FUNCTIONING ON THE BASIS OF A REGENERATIVE GAS CYCLIC PROCESS

(75) Inventor: Klaus Heikrodt, Dedelstorf-Oerrel (DE)

(73) Assignees: Robert Bosch GmbH, Stuttgart; Viessmann Werke GmbH, Allendorf/Eder, both of (DE)

( * ) Notice: Subject to any disclaimer, the term of this patent is extended or adjusted under 35 U.S.C. 154(b) by 0 days.

(21) Appl. No.: 09/738,430

(22) Filed: Dec. 15, 2000

Related U.S. Application Data

(63) Continuation of application No. 09/530,028, filed as application No. PCT/DE98/03100 on Oct. 22, 1998.

(30) Foreign Application Priority Data

Oct. 23, 1997 (DE) .......................................... 197 46 838

(51) Int. Cl.[7] .............................. F01P 1/00; F01B 29/10
(52) U.S. Cl. .......................................... 60/515; 60/517
(58) Field of Search ........................ 60/508, 515, 517, 60/520, 526

(56) References Cited

U.S. PATENT DOCUMENTS

| | | | |
|---|---|---|---|
| 3,456,438 A | * | 7/1969 | Meijer et al. |
| 3,656,295 A | * | 4/1972 | Fokker .......................... 60/24 |
| 5,074,114 A | * | 12/1991 | Meijer et al. .................. 60/517 |
| 5,794,444 A | * | 8/1998 | Hofbauer et al. .............. 60/517 |

FOREIGN PATENT DOCUMENTS

| | | |
|---|---|---|
| DE | 195 16 499 | 12/1996 |
| EP | 0 457 399 | 11/1991 |
| FR | 2 049 990 | 3/1971 |
| JP | 63 088250 | 4/1988 |

* cited by examiner

*Primary Examiner*—Hoang Nguyen
(74) *Attorney, Agent, or Firm*—Kenyon & Kenyon

(57) ABSTRACT

A method and a device for operating a heating and cooling machine, in particular a Vuilleumier heat pump, that functions on the basis of a regenerative gas cyclic process are described. The device includes a burner as the source of thermal driving, energy in which, to increase its efficiency or to maximize an output number of the heating and cooling machine, the combustion air conveyed to the burner is preheated in a heat exchange with exhaust gases. It is proposed that, for increasing the output performance of the heating and cooling machine, the preheating of the combustion air is forestalled at least partially. In response to a simultaneous increase of the burner output, the hot exhaust-gas mass-flow is conveyed to an exhaust-gas-water heat-exchanger.

In this manner, a output of the heating and cooling machine system is increased in an advantageous manner, without having to change the design data or the size of the heating and cooling machine.

7 Claims, 1 Drawing Sheet

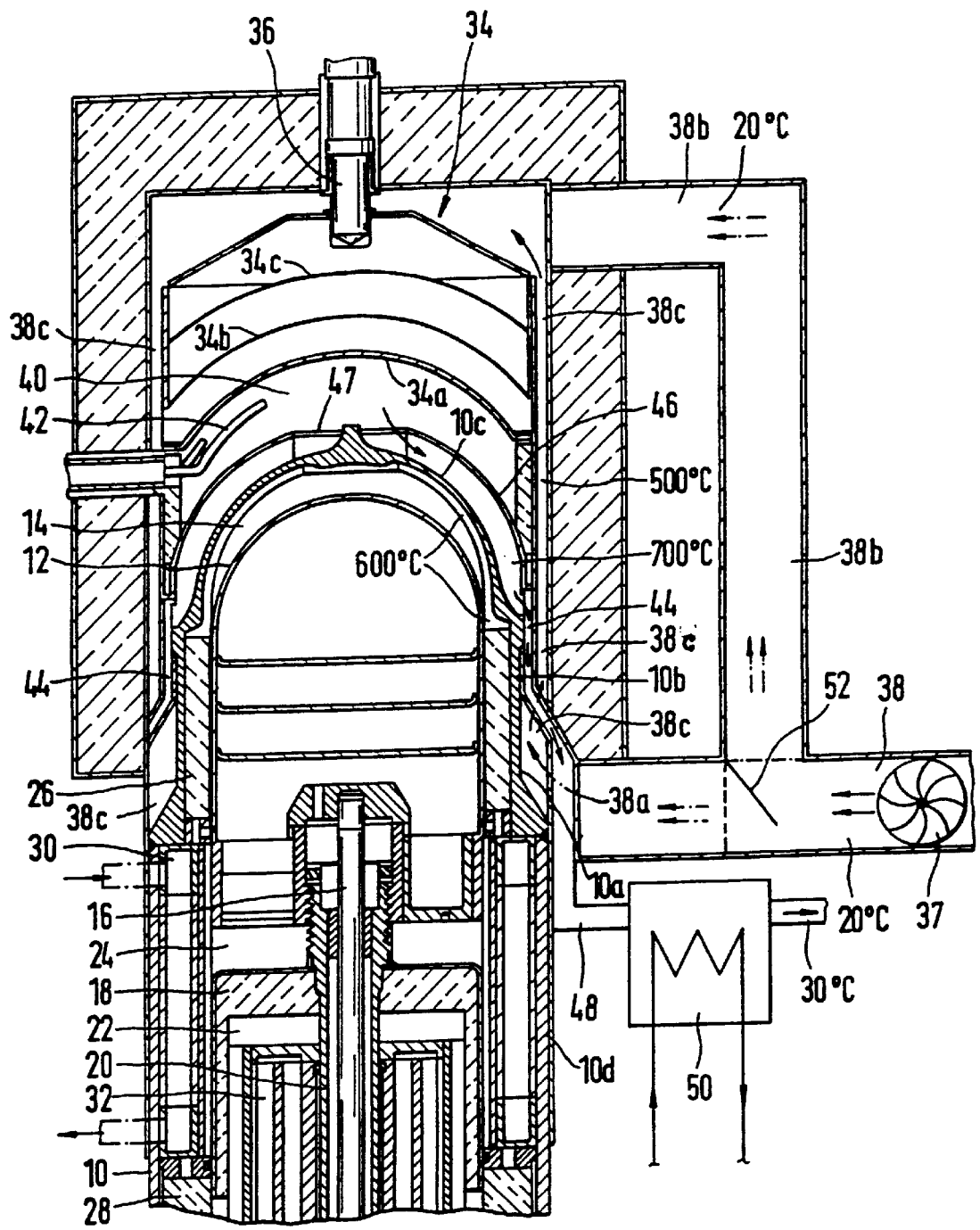

METHOD AND DEVICE FOR OPERATING A HEATING AND COOLING MACHINE FUNCTIONING ON THE BASIS OF A REGENERATIVE GAS CYCLIC PROCESS

This application is a continuation of application Ser. No. 09/530,028, filed Apr. 24, 2000 which is a 371 of PCT/DE98/03100, filed Oct. 22, 1998.

FIELD OF THE INVENTION

The present invention relates to a method for operating a heating and cooling machine that functions on the basis of a regenerative gas cyclic process, as well as a heating and cooling machine for carrying out the method.

BACKGROUND INFORMATION

German Patent no: 195 16 499 describes, a method for a heating and cooling machine in which the combustion air needed for the source of the thermal driving energy is preheated by exhaust gases arising from combustion. The preheating of the combustion air increases the overall efficiency of the burner and the overall performance number of the heating and cooling machine; at the same time, the heating and cooling machine is configured such that for a predetermined size, only a predetermined maximum heat output can be achieved at an optimal performance number.

In order to meet an increased heat demand, it is conventional for example, in addition to operating a heat pump, to employ, in a parallel bivalent operating mode, a second heat producer, e.g., a conventional gas heat thermal element or electrical heating element.

SUMMARY OF THE INVENTION

The control process according to the present invention and the device for carrying out the control process have the advantage that the size of a heating and cooling machine required for a predetermined heat output can be maintained while the output or overall capacity of the heating and cooling machine is increased in an advantageous manner.

In the rare cases of extremely low external temperatures, and an associated higher heat energy demand, IT is possible, for example, to make available a required output of 20 kW by a heating and cooling machine that is designed for 15 kW, due to the fact that the preheating of the combustion air is dispensed with partially or totally, whereas the burner output is increased and the hot exhaust gas mass flow is conveyed to an exhaust-gas-water heat-exchanger for further heat energy utilization.

The data on the frequency distribution of the external temperature and the associated heat demand underlying a German standard (DIN 4702/8) show that a less than 80% utilization of a heat producer is sufficient to cover 96% of the annual cumulated heat delivery. For the remaining uncovered 4% heat demand, the control process according to the present invention can be applied in the form of an integrated bivalence.

The preheating of the combustion air is controlled in an advantageous manner by a bypass channel circumventing the exhaust-gas heat-exchanger.

In order to achieve continuous control of the combustion air preheating in accordance with the required heat output, it is proposed to control the bypass channel by a bypass valve.

The burner output is increased in an advantageous manner through the fact that the combustion air flow generated by a blower fan and the combustion gas quantity are increased while the air number is kept the same.

BRIEF DESCRIPTION OF THE DRAWINGS

The FIGURE shows a schematic of a longitudinal section of a heating and cooling machine that implements a method according to the present invention.

DETAILED DESCRIPTION

In the drawing, the upper part of a pressure vessel 10 of a Vuilleumier heat pump is depicted. In the lower part of the pressure vessel 10, undepicted in the drawing, a gear unit is located. In the upper part of pressure vessel 10, a hot piston 12 is arranged, that limits a hot working volume 14. Hot piston 12 via a piston rod 16 is connected to the gear unit, undepicted in the drawing. Piston rod 16 passes through a cold piston 18, which is also connected to the gear unit via a hollow piston rod 20 surrounding piston rod 16. In the interior of cold piston 18, having a pot-shaped configuration, a cold working volume 22 is formed. Between hot piston 12 and cold piston 18, a warm working volume 24 is formed.

Three working volumes 14, 22, and 24 are connected to each other through the interposition of regenerators 26 and 28 as well as heat exchangers 30 and 32. Whereas hot regenerator 26 cold regenerator 28 and warm heat exchanger 30 are arranged directly on the interior side of pressure vessel 10, cold heat exchanger 32 is located in a stationary part inside cold piston 18, through which piston rods 16 and 20 pass.

Regenerators 26 and 28, connected in series with heat exchangers 30 and 32, are configured in an annular shape and they have process gas, under high pressure, flowing through them in the axial direction. This process gas also acts upon one side of heat exchangers 30 and 32, which on their other side are connected to an undepicted heating circulation circuit.

The heat input to hot working volume 14 is carried out by a radiant burner 34 operated using combustion gas, radiant burner includes a convex burner surface 34a and two combustion gas distributors 34b and 34c, which assure a uniform distribution of the combustion-gas-air mixture to burner surface 34a. The combustion gas necessary for the combustion is conveyed via a burner nozzle 36 and the combustion air by a blower fan 37 via a combustion air channel 38. In a combustion chamber 40, with the assistance of an ignition electrode 42, the combustion gas-air mixture is ignited at burner surface 34a, where the mixture reacts, releasing heat.

The operating mode of a Vuilleumier heat pump is conventional, so that the thermodynamic sequences are not discussed in any greater detail.

Downstream, combustion air channel 38 divides into a bypass channel 38b, which leads directly to burner 34, while segment 38a of the combustion air channel empties into an annular segment 38c that is routed around pressure vessel wall 10. The wall of the annular segment 10a, situated radially on the inside, is formed by a part of pressure vessel wall 10. Segment 38c of the combustion air channel also leads to burner 34 and is separated from the latter in the area of pressure vessel wall segment 10b by an annular exhaust gas channel 44. Located between burner surface 34a and a curved segment 10c of the pressure vessel wall, hereinafter designated as heater head, is an air guide 46 for the exhaust gases, which are forcibly conveyed via a central opening 47, arranged in air guide 46, to the exterior surface of heater head 10c. The channel formed between air guide 46 and heater head 10c passes laterally into exhaust gas channel 44. Exhaust gas channel 44, situated in the area of pressure vessel wall segment 10b directly on the pressure vessel wall, at the transition to pressure vessel wall segment 10a, is routed away from the pressure vessel wall and enters a channel segment 48, which leads to an exhaust-gas heating-water heat-exchanger 50. In the area of pressure vessel wall segment 10b, a heat exchange takes place between the exhaust gases in exhaust gas channel 44 and the combustion air in segment 38c of the combustion air channel.

In combustion air channel 38, a bypass valve 52 controlling the combustion air flow is arranged. Thy bypass value 52 is controlled as a function of the currently required heat demand or the load state of the heat pump.

If the heat pump is operating on the basis of a low heat demand in the partial load operation, then bypass valve 52 adopts the position indicated in the Figure by a dot-dash line, so that bypass channel 38b is completely closed and the entire combustion air quantity is conveyed via segment 38a of the combustion air channel to burner 34. The combustion air flow conveyed by blower fan 37 into combustion air channel 38 at roughly 20° C. is preheated in annular-shaped segment 38c of combustion air channel, inter alia, through the heat exchange with the exhaust gases, to the point that the combustion air, upon entry into burner 34, has temperatures ranging up to 500° C.

The exhaust gases, cooled through the heat exchange with the process gas to roughly 700° C., exit combustion chamber 40 via central opening 47 arranged in air guide 46 and are further cooled by the combustion air to roughly 200° C. in the area of exhaust gas channel 44. The exhaust gases at this temperature entering via channel segment 48 into exhaust-gas heating-water heat-exchanger 50 are cooled down to a temperature of roughly 30° C. The condensation enthalpy of the water vapor contained in the exhaust gases is also being used as a result of the fact that the temperature sinks below the dew point. The heat flow extracted by exhaust-gas heating-water heat-exchanger 50, in this context, is also included in the overall output balance of the system, in addition to the heat flow produced by the heat pump.

The output of the heat pump can be controlled via the heater head temperature and thus via the burner output. If the burner output changes, then the heater head temperature changes and thus also the temperature of the process gas, therefore ultimately also changing the heat flows exchanged via the heat exchangers 30, 32, and 50.

An increase of the heat output through the above described preheating of the combustion air, however, is only possible within certain ranges, since, in response to a further increase in the drive heat flow via burner 34, the combustion temperatures take on values that lead to a powerful thermal NOx rise; in addition, technically unrealistic demands would be placed in particular on the temperature resistance of the heater head material.

Here the control method according to the present invention finds its application, through the fact that in response to increasing heat demand, the preheating of the combustion air by the exhaust-gas heat-exchange is dispensed with partially or completely, whereas the burner output is increased and the hotter, uncooled exhaust-gas mass-flow is conveyed to exhaust-gas heating-water heat-exchanger 50. The preheating of the combustion air, in this context, is partially or completely forestalled by bypass valve 52, through the fact that in response to higher heat demands, via bypass valve 52, bypass channel 38b is cleared at least partially, so that a combustion air flow that is not, or is only partially preheated is conveyed to burner 34.

In the extreme case, i.e., in response to a full load operation of the heat pump, bypass valve 52 would take on the position indicated in the drawing by the dotted line, as a result of which the entire combustion air flow is conveyed via bypass channel 38b to burner 34. Thus the heat flows given off or taken on by the heat pump via heat exchanger 30, 32 would be reduced, because in response to lower heater head temperatures, the process gas located in pressure vessel 10 is not heated as strongly. This output loss is compensated for by the fact that the burner output is increased by the blower fan speed to the point that the heater head has the same temperature values as in an optimal operating mode with complete air preheating. A pneumatic combustion-gas-combustion-air ratio controller, in this context, controls the gas supply in accordance with the combustion air quantity supplied, so that the air number remains constant in the overall output range of burner 34.

By increasing the burner output, the heat flows taken on or given off via heat exchanger 30 and 32 of the heat pump remain constant. A larger exhaust-gas mass-flow, not or only partially cooled by the combustion air, is conveyed, however, to exhaust-gas heating-water heat-exchanger 50, so that a heat quantity up to roughly 20% more can be integrated, via exhaust-gas heating-water heat-exchanger 50, into the heating water circulation circuit. Although the efficiency or the output number of the heat pump deteriorates slightly in this mode of operation, the great advantage nevertheless exists in the improved adaptation of the construction size and output of the heat pump with respect to the heat demand arising throughout the year.

The described control process for increasing the output of a heating and cooling machine is not limited to the application for a Vuilleumier heat pump, but rather can be used in other thermally operated machines, such as in a Stirling engine.

What is claimed is:

1. A method for operating a heating and cooling machine that functions on the basis of a regenerative gas cyclic process, comprising the steps of:
   providing a burner as a source of thermal driving energy;
   preheating, by exhaust gases, combustion air conveyed to the burner during a heat exchange to one of:
      increase the efficiency of a heating and cooling machine, and
      maximize an output number of the heating and cooling machine;
   at least partially forestalling the step of preheating to increase an output of the heating and cooling machine; and
   in response to a simultaneous increase in output of the burner, conveying hot exhaust-gas mass flow to an exhaust-gas-water heat-exchanger.

2. The method according to claim 1, wherein:
   the heating and cooling machine is a Vuilleumier heat pump.

3. The method according to claim 1, further comprising the step of:
   controlling the preheating of the combustion air by a bypass channel, the bypass channel circumventing the exhaust-gas-water heat-exchanger.

4. The method according to claim 3, further comprising the step of:
   controlling, by a bypass valve, the combustion air conveyed via the bypass channel.

5. The method according to claim 1, further comprising the step of:

increasing combustion air flow generated by a blower fan and increasing combustion gas quantity while keeping an air number constant.

6. A device for operating a heating and cooling machine that functions on the basis of a regenerative gas cyclic process, comprising:

a burner;

a combustion air channel having a bypass channel leading directly to the burner, the bypass channel controlling preheating of combustion air; and an exhaust-gas-water heat-exchanger coupled via an exhaust gas outlet to the burner, wherein:

the burner is a source of thermal driving energy;

preheating, by exhaust gases, combustion air conveyed to the burner during a heat exchange, one of:

increases the efficiency of a heating and cooling machine, and maximizes an output number of the heating and cooling machine;

at least partially forestalling the step of preheating increases an output of the heating and cooling machine; and in response to a simultaneous increase of output of the burner, hot exhaust-gas mass glow is conveyed to the exhaust-gas-water heat-exchanger.

7. The device according to claim 6, further comprising:

a bypass valve arranged in the combustion air channel, the bypass valve controlling an opening of the bypass channel.

* * * * *

UNITED STATES PATENT AND TRADEMARK OFFICE
CERTIFICATE OF CORRECTION

PATENT NO. : 6,430,925 B1
DATED : August 13, 2002
INVENTOR(S) : Klaus Heikrodt

It is certified that error appears in the above-identified patent and that said Letters Patent is hereby corrected as shown below:

Column 2,
Line 40, change "combustion gas, radiant" to -- combustion gas. The radiant --

Column 3,
Line 13, change "Thy bypass" to -- The bypass --
Line 37, change "also being used" to -- also used --

Signed and Sealed this

Eighteenth Day of November, 2003

JAMES E. ROGAN
*Director of the United States Patent and Trademark Office*